United States Patent [19]

Marcot

[11] 4,209,412
[45] Jun. 24, 1980

[54] PROCESS FOR PRODUCING NONSTOICHIOMETRIC FERROSO-FERRIC OXIDES

[75] Inventor: Guy C. Marcot, Pulaski, Va.

[73] Assignee: Hercules Incorporated, Wilmington, Del.

[21] Appl. No.: 908,348

[22] Filed: May 22, 1978

[51] Int. Cl.² .................................................. C01G 49/08
[52] U.S. Cl. ................................. 252/62.62; 252/62.56
[58] Field of Search ............... 232/62.55, 62.56, 62.62; 106/304; 428/539

[56] References Cited

U.S. PATENT DOCUMENTS

| | | | |
|---|---|---|---|
| 3,573,980 | 4/1971 | Haller et al. | 252/62.56 X |
| 3,931,025 | 1/1976 | Woditsch et al. | 252/62.56 X |
| 3,953,656 | 4/1976 | Tokuoka et al. | 252/62.56 X |
| 4,053,325 | 10/1977 | Vanderheiden | 106/304 |
| 4,066,564 | 1/1978 | Sasazawa et al. | 252/62.56 |
| 4,082,905 | 4/1978 | Stephan et al. | 252/62.56 X |

FOREIGN PATENT DOCUMENTS 2507420  8/1976  Fed. Rep. of Germany.

*Primary Examiner*—Jack Cooper
*Attorney, Agent, or Firm*—Hazel L. Deming

[57] ABSTRACT

Magnetic, acicular, nonstoichiometric ferroso-ferric oxide particles having a unique combination of chemical, physical and magnetic properties and a process for producing the same are described. The ferroso-ferric oxide particles have a ferrous:ferric atomic ratio ranging from 0.05:1 to 0.25:1 and contain, based on total iron, 0.4 to 5.0 atomic % phosphorus, 2.0 to 10.0 atomic % zinc and 0 to 10.0 atomic % cobalt.

4 Claims, No Drawings

PROCESS FOR PRODUCING NONSTOICHIOMETRIC FERROSO-FERRIC OXIDES

This invention relates to magnetic, acicular, nonstoichiometric ferroso-ferric oxide particles having a unique combination of chemical, physical and magnetic properties and more particularly to nonstoichiometric ferroso-ferric oxide particles wherein the ferrous to ferric atomic ratio is 0.05 to 0.25 and the oxide contains, based on total iron, 0.4 to 5.0 atomic % phosphorus, 2.0 to 10.0 atomic % zinc and 0 to 10.0 atomic % cobalt. The invention also relates to a process for preparing these oxides to the use of these oxides as the magnetic material of magnetic recording media.

Acicular magnetic ferric oxide or ferroso-ferric oxide particles containing zinc or cobalt are known and are described, for example, by Stoller et al in U.S. Pat. No. 2,047,429, Miller in U.S. Pat. No. 3,047,505 and Haller et al in U.S. Pat. No. 3,573,980. Acicular magnetic iron oxides containing both zinc and cobalt and from 4 to 22 weight percent of divalent iron are described in Belgian Pat. No. 804,556 and said to have high saturation magnetization and improved storage stability over magnetic iron oxides modified with cobalt alone. The magnetic oxides of Belgian Pat. No. 804,556, however, have poor shape uniformity and do not provide with conventional binder formulations magnetic coatings having good surface smoothness, low noise and resistance to distortion or good signal response and, hence, do not meet current industry requirements.

Surface treatment of the goethite (alpha-FeOOH) starting material for gamma ferric oxide with hydrolysis-resistant oxyacids of phosphorus or its salts is taught by Abeck et al in U.S. Pat. No. 3,652,334 to prevent sintering and produce gamma $Fe_2O_3$ particles which exhibit higher coercivity and improved magnetic orientation than gamma $Fe_2O_3$ from untreated goethite. Additionally, Buxbaum et al in German Offenlegunscript No. 2,507,420 disclose that cobalt doped gamma $Fe_2O_3$ particles which have deposited thereon a coating of 0.1 to 5% of an oxide, hydroxide or phosphate of a multivalent metal such as zinc or iron have reduced remanence loss, reduced drop in coercivity on tempering and improved dispersibility in coating formulations as compared with cobalt doped gamma $Fe_2O_3$ particles which do not have the oxide or phosphate coatings. An after-treatment with phosphates or silica is also disclosed by Woditsch et al in U.S. Pat. No. 3,931,025 to improve the dimensional stability of the needle-like particles during conversion into magnetic oxides. Further, Woditsch et al teach that the presence of 0.1 to 4% of zinc ions and 0.1 to 2% of phosphate ions during formation of the alpha-FeOOH seed particles improves acicularity, prevents dendrite formation and gives more uniform particle size distribution than when the seed is prepared in the absence of zinc and phosphorus or in the presence of either zinc or phosphorus. The phosphate-containing acicular gamma ferric oxides of the Abeck et al, Buxbaum et al or Woditsch et al's patents do not provide the magnetostrictive stability, signal output or saturation moment required for audio and video tape applications and hence are of limited utility.

Further, Vanderheiden in U.S. Pat. No. 4,053,325 teaches improving the thermal stability and color quality of conventional yellow and black iron oxide pigments subject to color change due to dehydration or oxidation, respectively, by coating hydrated ferric oxide or ferroso-ferric oxide particles with 1% to 20% of an insoluble metal metaphosphate such as iron or zinc metaphosphate, and speculates that if the coated iron oxides were used as precursors for gamma $Fe_2O_3$, the magnetic iron oxide would have improved properties. The gamma ferric oxide particles of Vanderheiden, like those of Abeck et al, do not meet the high magnetic requirements of video application and are of limited utility.

Now, in accordance with the present invention, it has been found that certain acicular magnetic iron oxide particles which contain both phosphorus and zinc in specified amounts and which contain a particular ratio of ferrous iron to ferric iron exhibit excellent powder magnetics and excellent dispersibility characteristics and texture development in conventional coating systems and provide magnetic tapes exhibiting high stability to temperature and physical stresses, excellent abrasion resistance, and improved signal to noise ratio with less distortion. Accordingly, the present invention relates to a composition consisting essentially of magnetic acicular particles of nonstoichiometric ferroso-ferric oxides having a ferrous:ferric atomic ratio ranging from 0.05:1 to 0.25:1 and containing based on total iron 0.4 to 5.0 atomic % phosphorus, 2.0 to 10.0 atomic % zinc, and 0 to 10.0 atomic % cobalt; a process for producing the same by (a) forming an aqueous dispersion of acicular particles of non-magnetic ferric oxide or its hydrate, (b) treating said particles with from 0.4 to 5.0 atomic % phosphorus based on the iron of a water-soluble phosphorus-containing compound; (c) contacting the treated particles at a pH of at least 8.0 with a zinc compound in an amount based on the iron to provide 2.0 to 10.0 atomic % zinc adsorbed on the surface of the particles; (d) recovering the resulting particles from the aqueous medium; (e) heating the recovered particles under reducing conditions to form magnetite, and (f) converting the magnetite to a nonstoichiometric ferroso-ferric oxide having a ferrous:ferric atom ratio from 0.05:1 to 0.25:1 by partial oxidation or by oxidation and partial reduction; and to the use of the composition as the magnetic component of a magnetic recording medium.

By the term nonstoichiometric ferroso-ferric oxide is meant an iron oxide that does not conform to the law of definite proportions (stoichiometry). Such oxides are the Berthollide iron oxides and have a degree of oxidation between that of magnetite, $Fe_3O_4$ ($FeO_x$ where $X=1.33$) and maghemite, gamma-$Fe_2O_3$ ($FeO_x$ where $x=1.50$). The ferrous:total iron atomic ratio of the nonstoichiometric ferroso-ferric oxides is less than 1:3.

The magnetic acicular, nonstoichiometric ferroso-ferric oxide particles of this invention contain, as stated, 0.4 to 5.0 atomic % phosphorus and 2.0 to 10.0 atomic % of zinc based on the iron and have a ferrous to ferric atom ratio ranging from 0.05:1 to 0.25:1. Preferably, the atomic percent of phosphorus will range from 0.5 to 2.5 and the atomic percent of zinc will range from 2.0 to 7.0. When cobalt is present, the amount will usually range from 0.1 to 10.0 atomic % based on iron, and preferably will provide a ratio of zinc to cobalt of at least 0.6. Particularly preferred ferroso-ferric oxides have a ferrous to ferric atom ratio of 0.05 to 0.22 and most preferably to 0.05 to 0.20.

The magnetic acicular nonstoichiometric ferroso-ferric oxides of this invention exhibit excellent magnetic properties and provide magnetic tapes which meet the high performance standards of digital, audio, and helical video applications and withstand the demands of the newer hardward systems, particularly with respect to abrasion resistance and coating integrity without detriment to magnetic and electromagnetic stability when subjected to temperature and physical stresses.

The magnetic acicular ferroso-ferric oxides of this invention are prepared by a process which comprises the sequential steps of (a) forming an aqueous dispersion of acicular particles of non-magnetic ferric oxide or its hydrate, (b) treating said particles with from 0.4 to 5.0 atomic % phosphorus based on the iron of a water-soluble phosphorus-containing compound; (c) contacting the treated particles at a pH of at least 8.0 with a zinc compound in an amount based on the iron to provide 2.0 to 10.0 atomic % zinc adsorbed on the surface of the particles; (d) recovering the resulting particles from the aqueous medium; (e) heating the recovered particles under reducing conditions to form magnetite, and (f) converting the magnetite to a nonstoichiometric ferroso-ferric oxide having a ferrous:ferric atom ratio from 0.05:1 to 0.25:1 by partial oxidation or by oxidation and partial reduction.

The ferric oxide hydrate or ferric oxide particles used as the starting material for the process of this invention are nonmagnetic and are acicular in shape. Preferably, the particles will have a length of 0.2 to 1.0 micron and a length:width ratio of at least 5:1, and most preferably from 8:1 to 20:1. Particularly preferred starting materials are acicular particles of goethite (alpha-FeOOH), hematite (alpha-$Fe_2O_3$) and lepidocrocite (gamma-FeOOH). Acicular particles of these oxides are well known and are available commercially or can be produced conveniently from ferrous salt solutions using from less than one-third to greater than a stoichiometric equivalent of an alkaline hydroxide and then oxidizing the precipitated hydroxide in an acid medium (excess of ferrous solution) or basic medium (excess of alkaline solution) to give particles of the desired size. In a preferred embodiment of this invention the acicular particles are alpha-FeOOH particles which have been washed free of soluble salts and then reslurried in water to give an aqueodus dispersion. The concentration of the particles in the dispersion is not critical, the practical requirement being that sufficient water is present to permit adequate fluidity and ease of agitation.

The treatment step with a phosphorus-containing compound is preferably carried out by gradually introducing into the dispersion with agitation an aqueous solution of phosphoric acid or a water-soluble salt thereof and continuing agitation to achieve uniform distribution and adsorption on the iron oxide particles. The preferred phosphorus-containing compounds are inorganic salts or acids such as phosphoric acid, the mono-, di- or tri-alkali metal phosphates and specifically dihydrogen phosphate, disodium ortho phosphate, trisodium phosphate, sodium pyrophosphate, sodium metaphosphate and the like. The phosphorus-containing compounds will usually be added as a dilute aqueous solution and the temperature of the dispersion will range from about 30° to about 100° C. The amount of phosphorus-containing compound used should be sufficient to provide from about 0.4 to about 5.0 and preferably from about 0.5 to about 2.5 atomic % phosphorus based on the iron content.

As stated, the treated particles are contacted with a zinc compound at a pH of at least 8.0. Generally, and such is preferred, the zinc compound is added to the dispersion as an aqueous solution or dispersion and the pH is adjusted, as necessary, to provide a pH within the range of about 8.5 to about 10.0. Any zinc compound which is water-soluble or water-dispersible, such as zinc sulfate, zinc oxide, zinc chloride or zinc acetate, can be used and the amount of zinc used should be sufficient to provide a zinc deposit of about 2.0 to about 10.0 and preferably from about 2.0 to about 7.0 atomic percent zinc based on the iron. The exact manner in which the zinc is deposited on the particles is not completely understood. However, it has been found that the order of treatment is important to product uniformity and to the realization of the advantages of the invention.

Following treatment of the particles with zinc, the particles can be separated from the aqueous medium conventionally as by running the dispersion through a filter press, screen, etc., or by centrifuging and the recovered particles are washed, dried and then usually crushed to break up any agglomerates of a size above about 1 centimeter.

Conversion of the treated particles to magnetic ferroso-ferric oxides is conventional and can be conveniently carried out by charging the particles to a furnace, heating to remove any water of hydration, continuing heating in a reducing atmosphere to convert the dehydrated particles to magnetite ($Fe_3O_4$) and then heating in an oxidizing atmosphere to partially oxidize the particles to the desired ferrous:ferric atomic ratio. Alternatively, and such is preferred, the magnetite particles are completely reoxidized to the ferric state and then partially reduced to the desired ferrous:ferric atomic ratio. Normally, the charge will be introduced into a cold furnace, the temperature will be raised to about 250° to about 600° C. a reducing gas such as hydrogen and/or carbon monoxide will be introduced and heating will be continued at 300° to 500° C. in the reducing atmosphere for about 1 to about 4 hours to convert the dehydrated alpha-$Fe_2O_3$ particles to magnetite. Care should be exercized so that reduction to the magnetite form ($Fe_3O_4$) is approximately complete but does not proceed substantially further. Normally, the time required will vary with the temperature, the amount of reducing agent, inert gas and water vapor present and the gas flow as well as the particle size and specific surface area of the oxide. Appropriate conditions for a given system can be readily determined by one skilled in the art by a series of test runs.

Following reduction of the particles to the magnetite form, the atmosphere of the furnace is changed to oxidizing, preferably by terminating the reducing gas, purging with an inert gas and then introducing air or oxygen, and the particles are heated at 225° to 375° C. in an oxidizing atmosphere until the desired ratio of ferrous to ferric atoms is reached or, alternatively, the particles are completely oxidized to the ferric state and then partially reduced to the desired ferrous to ferric atomic ratio. The resulting particles are then recovered conventionally, usually by cooling in an inert atmosphere and then powdering in a ball mill, as, for example, using the procedure described in U.S. Pat. No. 2,954,303 to Westcott.

Higher coercivity in these oxides can also be realized by modifying the particles with cobalt, in which case the procedure includes adding a cobalt compound as an aqueous solution or dispersion to the aqueous dispersion of the particles of nonmagnetic ferric oxide or its hydrate or to the dispersion of the phosphorus treated particles prior to introduction of the zinc compound and, if necessary, adjusting the pH to provide a pH of at least 8.0, and preferably from about 8.2 to about 10. If desired, and such is generally preferred when the cobalt compound is added to the phosphorus treated particles, the procedure includes adding the total amount of phosphorus desired in two stages, i.e., before and after addition of the cobalt. Any cobalt compound which is water-soluble or readily dispersible in water, such as, for example, cobalt sulfate or cobalt hydrate can be used. In a preferred embodiment of this invention the amount of cobalt will range from 0.1 to 10.0 atomicpercent and preferably from 0.5 to 7.0 atomic percent based on the iron, and preferably will be such that the ratio of zinc to cobalt will be at least 0.6 and most preferably will range from 0.8 to 5.

The magnetic acicular nonstoichiometric ferroso-ferric oxides described by this invention are particularly useful for magnetic recording tape manufacture and can be dispersed easily in conventional solvents and binder systems and coated onto supports to provide, following drying and curing, as required, a magnetic recording medium such as a tape, disc or sheet. Magnetic tapes containing the iron oxides of this invention have superior properties as compared with commercial tapes presently available and are outstanding with respect to surface smoothness, abrasion resistance and stability when subjected to temperature and physical stresses.

The invention is further illustrated by the following examples wherein all percentages are by weight unless otherwise indicated.

EXAMPLE 1

A tank equipped with an agitator, heating means and a thermometer was charged with 1.89 kiloliters of an aqueous slurry containing 34.5 grams/liter of washed acicular alpha-FeOOH particles having an average particle length of about 0.6 micron and a length to width ratio of about 12. Agitation was commenced, the charge was heated to 70° C. and an oxygen-containing gas was passes through the agitated slurry at the rate of 1.9 liters per second. Sufficient sodium hydroxide as a 17% aqueous solution was added to the slurry to adjust the pH to 5.4 and 1.5 liters of 21.2% aqueous phosphoric acid were added gradually and the slurry was agitated for 1 hour at 70° C. Next 6.67 kilograms of zinc sulfate monohydrate ($ZnSO_4.H_2O$) were added to the slurry as a 30% aqueous zinc sulfate solution, the pH of the slurry was adjusted to 9.0 and the slurry was agitated for an additional 2 hours at 70° C. The slurry was press filtered, the presscake washed free of soluble salts, the washed presscake dried at 110° C. for 24 hours and the dried cake crushed to break up agglomerates. The crushed cake was next transferred to a calciner wherein it was dehydrated by heating to 365° C., reduced at 365° C. until 33.9% of the iron was in the ferrous state, oxidized at 327° C. until the weight % of FeO in the product was 0.7, reduced at 343° C. until 16.1% of the iron was in the ferrous state, heated in an inert atmosphere at 415° C. for 1 hour and then cooled in an inert atmosphere to room temperature. The resulting product, following ball milling to a densified powder, was acicular particles of a nonstoichiometric ferroso-ferric oxide having a ferrous to ferric atomic ratio of 0.16, and essentially the same particle shape as the starting alpha-FeOOH particles. The product contained by gravimetric analysis 65.5% iron as Fe and, based on the iron, 0.75 atomic % phosphorus and 5.0 atomic % zinc, and exhibited the following magnetic properties when measured by a B-H meter using a field of 2000 oersteds:

Coercivity ($H_C$)—385 oersteds
Remanence ($B_r$)—2620 gauss
Maximum Inductance (Bm)—4800 gauss The magnetic iron oxide was used to form a magnetic tape in the following manner. A dispersion coating composition was prepared containing the magnetic iron oxide by ball milling a charge of 34.8 grams of the iron oxide and 35 milliliters of a vehicle containing 61% of xylene, 26% of methyl isobutyl ketone, 7% of dioctyl terephthalate and 6% of a lecithin type wetting agent for 40 minutes, adding 45 milliliters of a 15% solution of a copolymer of vinyl chloride and vinyl acetate (90:10) in toluene/methyl ethyl ketone (2.3/1) to the charge and continuing milling for 20 minutes. The resulting dispersion (Brookfield viscosity at 30° C. using #'spindle at 20 RPM of 45 poises) was applied as a coating to a length of 25 micron biaxially oriented poly(ethylene terephthalate) film using a knife coater with orientation magnets at a film speed of about 18 meters/minute, the coated film was air-dried and a tape approximately 7 centimeters wide was cut from the coated film. The coated surface (coating thickness of 5 microns) was evaluated for gloss at low angle and under a microscope at 100X magnification and was rated excellent for gloss, texture, smoothness, and dispersion quality. The tape exhibited the following magnetic properties when measured with a B-H meter at a field strength of 1000 oersteds:

Coercivity ($H_c$)—354 oersteds
Remanence ($B_r$)—1290 gauss
Maximum Inductance ($B_m$)—1518 gauss
Squareness ($B_r/B_m$)—0.85
Switching Field Distribution ($H_\Delta$)—105 oersteds
Normalized Switching Field Distribution ($H_\Delta$/Hc)—0.30

EXAMPLE 2

The procedure of Example 1 was repeated except that: 1.89 kiloliters of an aqueous slurry containing 31.8 grams/liter of the acicular alpha-FeOOH particles were charged to the tank; 1.86 liters of 21.2% aqueous phoshoric acid were used; 5.35 kilograms of cobalt sulfate heptahydrate ($CoSO_4.7H_2O$) as a 20% aqueous cobalt sulfate solution were added gradually to the slurry containing the phosphoric acid-treated particles, the pH was adjusted to 8.5 and the slurry was agitated for 1 hour prior to introduction of the zinc sulfate; the amount of zinc sulfate monohydrate used was 6.23 kilograms; the dehydration step was carried out at 371° C.; the first reduction step was carried out at 371° C. until 34.2% of the iron was in the ferrous state; and the final reduction step was carried out until 17.1% of the iron was in the ferrous state. The resulting product was acicular particles of a nonstoichiometric ferroso-ferric oxide having a ferrous to ferric atomic ratio of 0.17 and the particles were essentially the same shape as the starting FeOOH particles. The product contained by analysis 62.5% iron as Fe and, based on the iron, 0.80 atomic % phosphorus, 2.8 atomic % cobalt and 5.1 atomic % zinc. The product exhibited the following magnetic properties when measured by a B-H meter using a field of 2000 oersteds:

Coercivity ($H_c$)—656 oersteds
Remanence ($B_r$)—2380 gauss
Maxium Inductance ($B_m$)—4350 gauss When the magnetic iron oxide was used to form a tape according to the procedure of Example 1, the tape was very smooth, had good gloss and exhibited the following magnetic properties when measured by a B-H meter using a field strength of 2000 oersteds:

Coercivity ($H_c$)—689 oersteds
Remanence ($B_r$)—1420 gauss
Maximum Inductance ($B_m$)—1775 gauss
Squareness ($B_r/B_m$)—0.80
Switching Field Distribution ($H_\Delta$)—224 oersteds
Normalized Switching Field Distribution ($H_\Delta/H_c$)—0.34

A control was prepared using the above procedure except that no phosphoric acid was added to the slurry and the slurry was adjusted to a pH of 8.3 prior to introduction of the zinc sulfate. The resulting product contained by analysis 62.8% iron as Fe, had a ferrous to ferric atomic ratio of 0.17, contained based on the iron 2.8 atomic % cobalt and 5.1 atomic % zinc and exhibited the following magnetic properties (field of 2000 oersteds)

Coercivity ($H_c$)—610 oersteds
Remanence ($B_r$)—2580 gauss
Maximum Inductance ($B_m$)—4810 gauss When this control oxide was used to form a tape according to the procedure of Example 1, the tape exhibited the following magnetic properties:

Coercivity ($H_c$)—628 oersteds
Remanence ($B_r$)—1275 gauss
Maximum Inductance ($B_m$)—1725 gauss
Squareness ($B_r/B_m$)—0.74
Switching Field Distribution ($H_\Delta$)—268 oersteds
Normalized Switching Field Distribution ($H_\Delta/Hc$)—0.43

The gloss, smoothness, texture and dispersability characteristics of the magnetic surface of the control tape were inferior to the tape coated with the magnetic oxide of this example.

The X-ray diffraction patterns for the product of this example and the control were compared using the Guinier technique and a chromium target tube. The patterns were similar but not identical and the pattern for the control contained two definite, but unidentified, lines not present in the pattern for the product of this example. The product of this example had a cell constant, a, equal to 8.381 whereas the control had a cell constant of 8.378.

EXAMPLE 3

A tank equipped with an agitator, heating means and a thermometer was charged with 1.89 kiloliters of an aqueous slurry containing 30.8 grams/liter of the acicular alpha-FeOOH particles of Example 1. Agitation was commenced, the charge was heated to 70° C. and an oxygen-containing gas was passed through the agitated slurry at the rate of 1.9 liters per second. An aqueous dispersion containing 17% of cobalt hydrate was separately prepared and 9.31 kilograms of the dispersion were added gradually to the agitated tank slurry over the period of 30 minutes, the final pH of the slurry being 8.5. Next, 2.1 liters of 21.2% aqueous phosphoric acid were added and the slurry was agitated for 1 hour. An aqueous dispersion containing 16% zinc oxide was separately prepared and 17.5 kilograms of the dispersion were added gradually to the agitated slurry and agitation was continued for an additional hour at a pH of 9.0. The slurry was press filtered, the presscake washed free of soluble salts, the washed presscake dried at 110° C. for 24 hours and the dried cake crushed to break up agglomerates. The crushed cake was next transferred to a calciner wherein it was dehydrated by heating up to 371° C., reduced at 371° C. until 33.8% of the iron was in the ferrous state, oxidized at 327° C. until the weight % of FeO in the product was 0.3, reduced at 349° C. until 16.8% of the iron was in the ferrous state, heated in an inert atmosphere at 399° C. for 1 hour and then cooled to room temperature in an inert atmosphere. The resulting product, following ball milling to a densified powder, was acicular particles of a nonstoichiometric ferroso-ferric oxide having a ferrous to ferric atomic ratio of 0.16 and having essentially the same shape as the starting alpha-FeOOH particles. The product contained 62.8% iron as Fe and, based on the iron, 2.5 atomic % cobalt, 1.0 atomic % phosphorus and 5.0 atomic % zinc and exhibited the following magnetic properties when measured by a B-H meter using a field of 3000 oersteds:

Coercivity ($H_c$)—702 oersteds
Remanence ($B_r$)—2300 gauss
Maximum Inductance ($B_m$)—4250 gauss When the magnetic iron oxide was used to form a tape according to the procedure of Example 1, the tape exhibited good gloss and surface smoothness and exhibited the following magnetic properties at a field strength of 2000 oersteds:

Coercivity ($H_c$)—742 oersteds
Remanence ($B_r$)—1820 gauss
Maximum Inductance ($B_m$)—2330 gauss
Squareness ($B_r/B_m$)—0.78
Switching Field Distribution ($H_\Delta$)—236 oersteds
Normalized Switching Field Distribution ($H_{66}/H_c$)—0.32

EXAMPLE 4

The procedure of Example 2 was repeated except that: 1.89 kiloliters of an aqueous slurry containing 34.8 grams/liter of the acicular alpha-FeOOH particles were charged to the tank; 1.52 liters of 21.2% aqueous phosphoric acid were used; 7.81 kilograms of the aqueous cobalt hydrate dispersion of Example 3 were substituted for the 5.35 kilograms of cobalt sulfate heptahydrate and the agitation was continued for 2 hours; 19.1 kilograms of the aqueous zinc oxide dispersion of Example 3 was substituted for the 6.23 kilograms of zinc sulfate and the pH was adjusted to 9.3; the dehydration step was carried out at 366° C., the first reduction step was carried out at 366° C. until 33.6% of the iron was in the ferrous state; the oxidation step was continued until the weight percent of FeO in the product was 0.4; the final reduction step was carried out at 349° C. until 16.3% of the iron was in the ferrous state; and prior to cooling, the product was heated in an inert atmosphere at 421° C. for 1 hour.

The product, following ball milling, was acicular particles of a nonstoichiometric ferroso-ferric oxide having a ferrous to ferric atom ratio of 0.15 and having essentially the same shape as the starting alpha-FeOOH particles. The product contained 63.6% iron as Fe and, based on the iron, 0.7 atomic % of phosphorus, 1.9 atomic % of cobalt, and 5 atomic % of zinc and exhibited the following magnetic properties using a field of 2000 oersteds:

Coercivity ($H_c$)—535 oersteds
Remanence ($B_r$)—2150 gauss
Maximum Inductance ($B_m$)—3890 gauss When the magnetic iron oxide was used to form a tape according to the procedure of Example 1, the tape exhibited good gloss, surface smoothness and texture and exhibited the following magnetic properties when measured at a field strength of 2000 oersteds:

Coercivity ($H_c$)—547 oersteds
Remanence ($B_r$)—1350 gauss
Maximum Inductance ($B_m$)—1730 gauss
Squareness ($B_r/B_m$)—0.78
Switching Field Distribution ($H_\Delta$)—164 oersteds
Normalized Switching Field Distribution ($H_\Delta/H_c$)—0.30

Helical type video tape produced from the magnetic iron oxide of this example exhibited superior smoothness, video clarity, temperature stability, video signal/-noise ratio and freedom from chroma noise and extreme durability during extended stillscan testing as compared with commercially available helical video tapes.

EXAMPLE 5

The procedure of Example 3 was repeated except that: the starting slurry contained 29.5 grams/liter of the acicular alpha-FeOOH particles; 19.6 kilograms of the cobalt dispersion, 3.9 liters of 21.2% aqueous phosphoric acid and 19.9 kilograms of the zinc oxide dispersion was used; the first reduction step was carried out until 33.5% of the iron was in the ferrous state; the oxidation step was continued until the weight percent of FeO was 0.4; and the final reduction step was carried out until 17.0% of the iron was in the ferrous state. The ball-milled product was acicular particles of a nonstoichiometric ferroso-ferric oxide having a ferrous to ferric atomic ratio of 0.16, and essentially all of the particles had the same shape and size as the starting alpha-FeOOH particles. The product contained 60.6% iron and, based on the iron, 2.25 atomic % phosphorus, 5.53 atomic % cobalt and 5.0 atomic % zinc and exhibited the following magnetic properties using a field of 3000 oersteds:
Coercivity ($H_c$—955 oersteds
Remanence ($B_r$)—2220 gauss
Maximum Inductance ($B_m$)—3970 gauss When the magnetic iron oxide was used to form a tape according to the procedure of Example 1, the tape exhibited the following magnetic properties when measured at a field strength of 300 oersteds:
Coercivity ($H_c$)—1078 oersteds
Remanence ($B_r$)—1670 gauss
Maximum Inductance ($B_m$)—2250 gauss
Squareness ($B_r/B_m$)—0.74
Switching Field Distribution ($H_\Delta$)—390 oersteds
Normalized Switching Field Distribution ($H_\Delta/H_c$)—0.36

EXAMPLE 6

The procedure of Example 4 was repeated except that: 7.1 kilograms of an 8% aqueous dispersion of cobalt hydrate and 18.1 kilograms of a 7% aqueous dispersion of zinc oxide were used; the dehydration step was carried out at 404° C.; the first reduction step was carried out at 404° C. until 35.2% of the iron was in the ferrous state; the oxidation step was carried out at 354° C. until the weight percent of FeO in the product was 0.2; the final reduction step was carried out at 366° C. until 7.4% of the iron was in the ferrous state; and prior to cooling, the product was heated in an inert atmosphere at 427° C. for 1 hour.

The product, following ball milling, was acicular particles of a nonstoichiometric ferroso-ferric oxide having a ferrous to ferric atom ratio of 0.07 and essentially all of the particles had the same shape and size as the starting alpha-FeOOH particles. The product contained 64.7% iron as Fe and, based on the iron, 0.75 atomic % phosphoruc, 0.75 atomic % cobalt and 2.19 atomic % zinc and exhibited the followig magnetic properties using a field of 1000 oersteds:
Coercivity ($H_c$)—398 oersteds
Remanence ($B_r$)—2100 gauss
Maximum Inductance ($B_m$)—3670 gauss When the magnetic iron oxide was used to form a tape according to the procedure of Example 1, the tape exhibited a high degree of surface smoothness and gloss and the following magnetic properties when measured at a field strength of 1000 oersteds:
Coercivity ($H_c$)—398 oersteds
Remanence ($B_r$)—1290 gauss
Maximum Inductance ($B_m$)—1575 gauss
Squareness ($B_r/B_m$)—0.82
Switching Field Distribution ($H_\Delta$)—140 oersteds
Normalized Switching Field Distribution ($H_\Delta/H_c$)—0.35.

What I claim and desire to protect by Letters Patent is:

1. A process for producing magnetic acicular particles of nonstoichiometric ferroso-ferric oxides having a ferrous:ferric atomic ratio ranging from 0.05:1 to 0.25:1 and containing based on total iron 0.4 to 5.0 atomic % phosphorus and 2.0 to 10.0 atomic % zinc, which process comprises the steps of
   (a) forming an aqueous dispersion of acicular particles of nonmagnetic ferric oxide or its hydrate;
   (b) treating said particles in the aqueous dispersion at a temperature between about 30° and about 100° C. with a water-soluble phosphorus-containing compound in an amount to provide from 0.4 to 5.0 atomic % phosphorus based on the iron adsorbed on the surface of the particles;
   (c) contacting the treated particles in the aqueous dispersion at a pH of at least 8.0 with a zinc compound in an amount based on the iron to provide 2.0 to 10.0 atomic % zinc adsorbed on the surface of the particles;
   (d) recovering the resulting particles from the aqueous medium;
   (e) heating the recovered particles under reducing conditions to form magnetite; and
   (f) converting the magnetite to a nonstoichiometric ferroso-ferric oxide having a ferrous:ferric atom ratio from 0.05:1 to 0.25:1.

2. The process of claim 1 wherein the phosphorus compound is phosphoric acid.

3. The process of claim 2 wherein the treated particles of step (b) are modified with cobalt by contacting the particles in the aqueous dispersion with a cobalt compound in an amount to provide 0.1 to 10.0 atomic % cobalt based on the iron at a pH of at least 8 prior to contact with the zinc compound.

4. The process of claim 2 wherein the particles of step (a) are modified with cobalt by contacting the particles in the aqueous dispersion with a cobalt compound in an amount to provide 0.1 to 10.0 atomic % cobalt based on the iron at a pH of at least 8 prior to treatment with the phosphoric acid.

* * * * *